United States Patent [19]
Janness

[11] Patent Number: 6,071,045
[45] Date of Patent: Jun. 6, 2000

[54] CUTTING INSERT AND TOOL

[76] Inventor: Daniel Janness, 6947 Vernmoor, Troy, Mich. 48098

[21] Appl. No.: 09/073,416

[22] Filed: May 6, 1998

[51] Int. Cl.[7] ....................................................... B23C 5/20
[52] U.S. Cl. ................................. 407/42; 407/48; 407/62; 407/65; 407/113
[58] Field of Search .................................... 407/113, 114, 407/118, 40, 42, 46, 48, 50, 47, 54, 62, 65; 408/228

[56] References Cited

U.S. PATENT DOCUMENTS

| | | |
|---|---|---|
| 1,409,960 | 3/1922 | McKenzie . |
| 2,237,901 | 4/1941 | Chun . |
| 2,264,922 | 12/1941 | Van Hooser ......................... 408/228 X |
| 2,289,344 | 7/1942 | Cedarleaf . |
| 3,084,416 | 4/1963 | Broughton . |
| 3,248,975 | 5/1966 | Breuning . |
| 3,289,272 | 12/1966 | Stier . |
| 3,293,727 | 12/1966 | Simms . |
| 3,299,489 | 1/1967 | Pohle . |
| 3,310,859 | 3/1967 | Diemond et al. . |
| 3,354,526 | 11/1967 | Erkfritz . |
| 3,416,209 | 12/1968 | Contrucci et al. . |
| 3,460,409 | 8/1969 | Stokey .................................. 407/54 X |
| 3,520,042 | 7/1970 | Stier . |
| 3,902,232 | 9/1975 | Hertel . |
| 4,047,826 | 9/1977 | Bennett . |
| 4,493,596 | 1/1985 | Grunsky et al. . |
| 4,566,828 | 1/1986 | Reinauer . |
| 4,595,322 | 6/1986 | Clement . |
| 4,602,897 | 7/1986 | Teets ..................................... 407/42 X |
| 4,614,463 | 9/1986 | Hughes .................................. 407/62 X |
| 4,854,789 | 8/1989 | Evseanko, Jr. . |
| 5,137,398 | 8/1992 | Omori et al. . |
| 5,354,156 | 10/1994 | von Haas et al. . |
| 5,632,576 | 5/1997 | Storch ................................... 407/54 X |
| 5,647,699 | 7/1997 | Martin et al. ......................... 407/50 X |
| 5,669,744 | 9/1997 | Hines . |

*Primary Examiner*—Henry W. H. Tsai
*Attorney, Agent, or Firm*—Howard & Howard

[57] ABSTRACT

A cutting insert (20) having a geometrical configuration comprising first and second oppositely facing, parallel faces interconnected by a V-shaped bottom (26) and side (28) and top (30) walls perpendicular to the faces with the side walls (28) being parallel to one another. The cutting insert (20) has first (32) and second (34) flutes disposed on opposite sides of a center axis with the first flute (32) extending in an arc from the top wall (30) to one of the side walls (28) and the second flute (34) extending in an arc from the top wall (30) to the other of the side walls (28). The first flute (32) presents a flute surface extending in the arc and is disposed at an angle sloping downwardly from the first face (22) to the second face (24) along the entire arc thereof to define intersections with the top wall (30) and one of the side walls (28) respectively which are disposed at an angle other than 90° relative to the faces. The second flute (34) similarly presents a flute surface extending in the arc and is disposed at an angle sloping downwardly from the second face (24) to the first face (22) along the entire arc thereof to define intersections with the top wall (30) and the other side wall (28) respectively which are disposed at an angle other than 90° relative to the faces. Each of the flute surfaces slopes downwardly at a greater angle at the center of the arc thereof than at the ends of the arc thereof.

17 Claims, 2 Drawing Sheets

CUTTING INSERT AND TOOL

BACKGROUND OF THE INVENTION

1. Technical Field

The subject invention relates to a cutting insert and, more particularly, to a cutting insert of the type for cutting rounded corners in a workpiece.

2. Description of the Prior Art

Numerous cutting inserts are known in the prior art, each having a specific geometrical configuration for performing a specific cutting or milling operation. A large group of cutting tools are dedicated to drilling holes, e.g., drill bits. One such tool is shown in U.S. Pat. No. 4,568,227 to Hogg to include a pointed cutting tip with asymmetrical flutes on either side.

However, there are a wide variety of cutting inserts for cutting convex rounded corners and the subject invention provides an improved geometrical configuration for such a cutting insert.

SUMMARY OF THE INVENTION AND ADVANTAGES

A cutting insert comprising first and second oppositely facing, parallel faces interconnected by bottom, side and top walls perpendicular to the faces with the side walls being parallel to one another. The cutting insert has a center axis centrally disposed between the walls and first and second flutes disposed on opposite sides of the center axis. A first of the flutes extends in an arc from the top wall to one of the side walls and a second of the flutes extends in an arc from the top wall to the other of the side walls. The first flute presents a flute surface extending in the arc and disposed at an angle sloping downwardly from the first face to the second face along the entire arc thereof to define intersections with the top wall and one of the side walls respectively which are disposed at an angle other than 90° relative to the faces. The second flute likewise presents a flute surface extending in the arc and disposed at an angle sloping downwardly from the second face to the first face along the entire arc thereof to define intersections with the top wall and the other side wall respectively which are disposed at an angle other than 90° relative to the faces.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
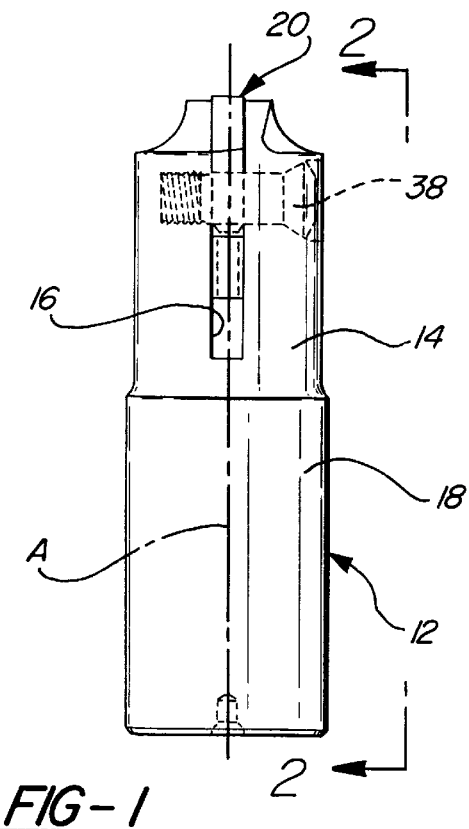
FIG. 1 is a side elevational view of the cutting insert of the subject invention mounted in a tool holder.
Figure 2:
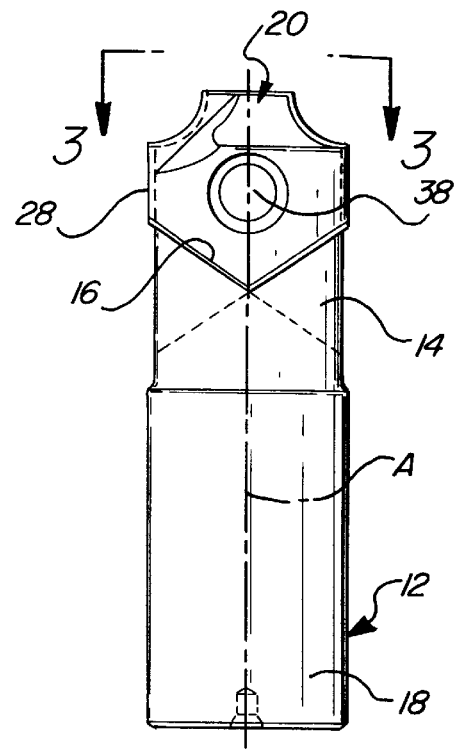
FIG. 2 is a view taken along line 2—2 of FIG. 1.
Figure 3:
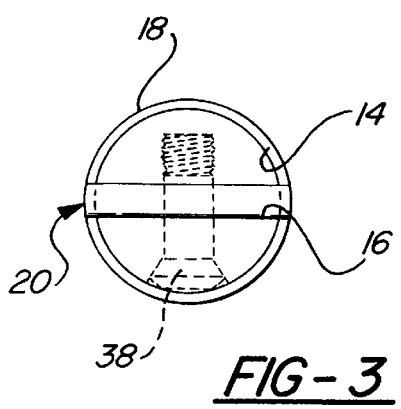
FIG. 3 is a view taken along line 3—3 of FIG. 2.

Referring to the Figures, wherein like numerals indicate like or corresponding parts throughout the several views, a cutting tool assembly is shown in FIGS. 1 through 3 comprising an elongated tool holder or shaft 12 having an axis of rotation A and a first end defining a pocket portion 14 having a pocket 16 and a second end defining a support portion 18 for support in a machine. A cutting insert, generally indicated at 20, is disposed in the pocket 16. The elongated tool holder 12 is circular in cross section with the pocket portion 14 having a first diameter smaller than the diameter of the support portion 18.

The cutting insert 20 has first 22 and second 24 oppositely facing, parallel faces interconnected by bottom 26, side 28 and top walls 30 with the side walls 28 being parallel to one another. The cutting insert 20 has a center axis B centrally disposed between the side walls 28 and axially aligned with the axis of rotation of the tool holder 12.

The cutting insert 20 has a first 32 and second 34 flutes disposed on opposite sides of the center axis. The first flute 32 extends in an arc from the top wall 30 to one of the side walls 28 and the second flute 34 extends in an arc from the top wall 30 to the other of the side walls 28. The first flute 32 presenting a flute surface disposed at an angle sloping downwardly from the first face 22 to second face 24. In like geometry, the second flute 34 presents a flute surface disposed at an angle sloping downwardly from the second face 24 to the first face 22 whereby the flutes 32 and 34 are asymmetrical relative to the center axis. The cutting insert 20 has a hole 36 extending between the faces and a fastener 38 extends through the hole 36 and engages the tool for securing the cutting insert 20 in the pocket 16. The hole 36 is offset 0.005 inch from the axis of the fastener 38 to force the insert 20 downward into the pocket 16.

The top wall 30 lies in a plane which is perpendicular to the center axis and the side walls 28 to define non-cutting intersections 40, 42 and 44 between the top wall 30 and the faces and the flutes 32 and 34.

Figure 7:
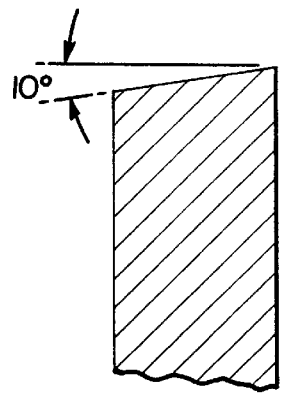
FIG. 7 is a view taken along line 7—7 of FIG. 4.
Figure 4:
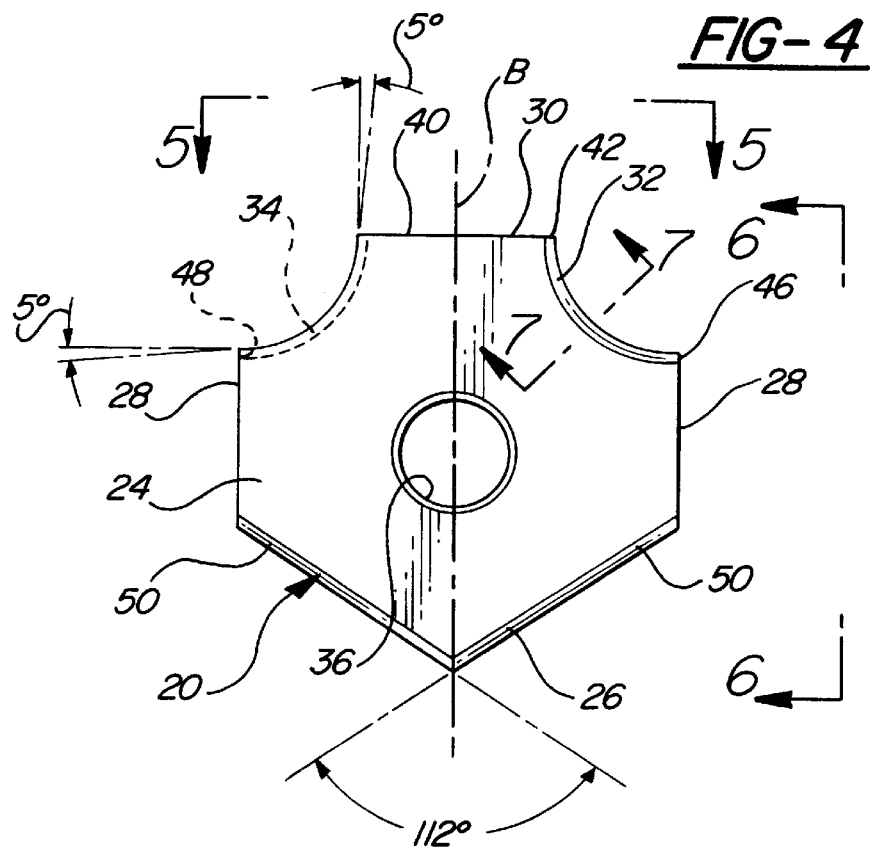
FIG. 4 is a front elevational view of the cutting insert of the subject invention.
Figure 5:
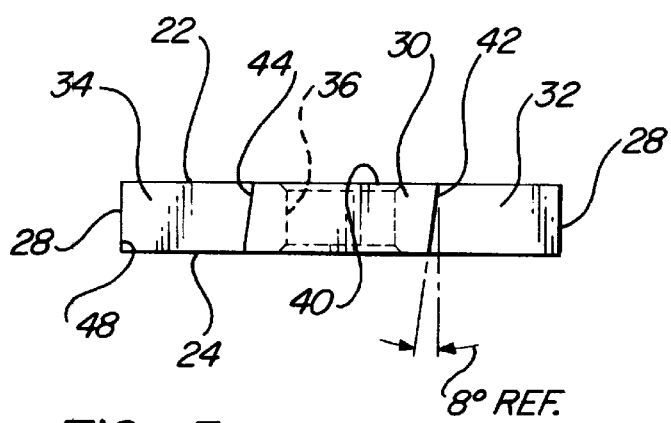
FIG. 5 is a view taken along line 5—5 of FIG. 4.
Figure 6:
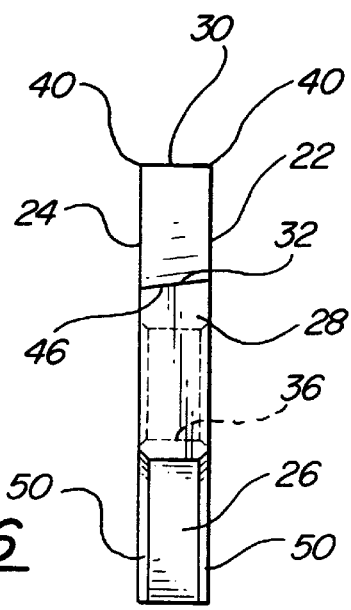
FIG. 6 is a view taken along line 6—6 of FIG. 4.

The flute surface of the first flute 32 slopes from the first face 22 to second face 24 at an acute angle relative to the first face 22 to define a first line intersection 42 with the top wall 30 which is disposed at an angle other than 90° relative to the faces 22 and 24. The flute surface of the second flute 34 slopes in the opposite direction from the second face 24 to first face 22 at an acute angle relative to the second face 24 to define a second line intersection 44 with the top wall 30 which is disposed at an angle other than 90° relative to the faces 22 and 24 and parallel to the first line intersection 42. Therefore, the line intersections 42 and 44 and the first 22 and second 24 faces define a parallelogram as viewed from the top, i.e., FIG. 5. The flute surface of the first flute 32 slopes from the first face 22 to second face 24 along the entire length of the arc thereof at an acute angle relative to the first face 22 to define a third line intersection 46 with one of the side walls 28 which is disposed at an angle other than 90° relative to the faces 22 and 24. In like fashion, the flute surface of the second flute 34 slopes from the second face 24 to first face 22 along the entire length of the arc thereof at an acute angle relative to the second face 24 to define a fourth line intersection 48 with the other side wall 28 which is disposed at an angle other than 90° relative to the faces 22 and 24. More specifically, and by way of example, when the distance between the side walls 28 is one and one quarter inches, the radius of the arcs of the flutes 32 and 34 is between 9/32 to 3/8 inch and the slope at the line intersections 42, 44, 46 and 48 is five degrees (5°) whereas the slope at the midlength of the arcs, as illustrated in FIG. 7, is ten degrees (10°). Therefore, each of the flute surfaces slopes downwardly at a greater angle at the center of the arc thereof than at the ends of the arc thereof. Also, the first, second, third and fourth intersections 42, 44, 46 and 48 are all disposed at the same predetermined angle of slope, i.e., five degrees (5°).

The elongated tool holder 12 is circular in cross section with the pocket portion 14 having a first diameter smaller than the distance between the side walls 28 of the insert and a support portion 18 at the second end having a second diameter substantially the same as the distance between the side walls 28 of the insert. In the size exemplified above, the distance between the side walls 28 is one and 1.25 inches, plus or minus ten thousandths, and the diameter of the support portion 18 is between 1.2498 and 1.2495 inches. Other sizes are:

1. Mini-Series ½ inch diameter holder having inserts with 0.010 Rad.; 0.015 Rad.; and 0.020 and 0.025 Rads.;
2. ¾ inch diameter holder having inserts with 1/32, 1/16, 3/32 and 1/8 Rads;
3. 1.00 inch diameter holder having inserts with 5/32, 3/16, 7/32 and ¼ Rads;
4. 1.25 inch diameter holder shown in application; and
5. 1.50 inch diameter holder having inserts with 13/32, 7/16, 15/32 and ½ Rads.

To secure the insert into the pocket 16, the bottom 26 is V-shaped and the pocket 16 includes a complementary bottom engaging the V-shaped bottom 26. Also, the V-shaped bottom 26 has an included angle of 112° and the edges thereof are beveled at 50 between the V-shaped bottom 26 and the faces 22 and 24.

The invention has been described in an illustrative manner, and it is to be understood that the terminology which has been used is intended to be in the nature of words of description rather than of limitation.

Obviously many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A cutting tool assembly comprising:
   an elongated tool holder (12) having an axis of rotation and a first end for support in a machine and a second end having a pocket (16);
   a cutting insert (20) disposed in said pocket (16);
   said cutting insert (20) having first and second oppositely facing, parallel faces interconnected by a bottom (26) and side (28) and top (30) walls with said side walls (28) being parallel to one another, said parallel faces extending co-extensively between said side walls (28);
   said cutting insert (20) having first (32) and second (34) flutes disposed on opposite sides of said center axis, said first flute (32) extending in an arc from the top wall (30) to one of the side walls (28) and said second flute (34) extending in an arc from the top wall (30) to the other of the side walls (28), said first flute (32) presenting a flute surface disposed at an angle sloping downwardly from said first face (22) to said second face (24), said second flute (34) presenting a flute surface disposed at an angle sloping downwardly from said second face (24) to said first face (22) whereby said flutes (32 and 32) are asymmetrical relative to said center axis, said cutting insert (20) having a hole (36) extending transversely to and between said faces, a fastener (38) extending through said hole (36) and engaging said tool holder (12) for securing said cutting insert (20) in said pocket (16), said top wall (30) lying in a plane which is perpendicular to said center axis and said side walls (28) to define non-cutting intersections between said top wall (30) and said flutes (32 and 34).

2. The assembly as set forth in claim 1 wherein said elongated tool holder (12) is circular in cross section with a pocket portion (14) at said second end having a first diameter smaller than the distance between said side walls (28) of said insert and a support portion (18) at said first end having a second diameter substantially the same as said distance between said side walls (28) of said insert.

3. The assembly as set forth in claim 1 wherein said bottom (26) is V-shaped and said pocket (16) includes a complementary bottom engaging said V-shaped bottom (26).

4. The assembly as set forth in claim 3 wherein said V-shaped bottom (26) has an included angle of 112°.

5. The assembly as set forth in claim 1 wherein said flute surface of said first flute (32) slopes from said first face (22) to said second face (24) an acute angle relative to said first face (22) to define a first line intersection (42) with said top wall (30) which is disposed at an angle other than 90° relative to said faces, and said flute surface of said second flute (34) slopes from said second face (24) to first face (22) an acute angle relative to said second face (24) to define a second line intersection (44) with said top wall (30) which is disposed at an angle other than 90° relative to said faces and parallel to said first line intersection (42) whereby said line intersections (42 and 44) and said first (22) and second (24) faces define a parallelogram as viewed from the top.

6. The assembly as set forth in claim 5 wherein said flute surface of said first flute (32) slopes from said first face (22) to second face (24) along the entire length of the arc thereof to define a third line intersection (46) with one of said side walls (28) which is disposed at an angle other than 90° relative to said faces, and said flute surface of said second flute (34) slopes from said second face (24) to first face (22) along the entire length of the arc thereof to define a fourth line intersection (48) with the other side which is disposed at an angle other than 90° relative to said faces.

7. A cutting tool assembly comprising:
   an elongated tool holder (12) having an axis of rotation and a first end for support in a machine and a second end having a pocket (16);
   a cutting insert (20) disposed in said pocket (16);
   said cutting insert (20) having a first and second oppositely facing, parallel faces interconnected by a bottom (26) and side (28) and top (30) walls with said side walls (28) being parallel to one an other;
   said cutting insert (20) having a center axis centrally disposed between said side walls (28) and axially aligned with said axis of rotation of said tool holder (12);
   said cutting insert (20) having first (32) and second (34) flutes disposed on opposite sides of said center axis, said first flute (32) extending in an arc from the top wall (30) to one of the side walls (28) and said second flute (34) extending in an arc from the top wall (30) to the other of the side walls (28), said first flute (32) presenting a flute surface disposed at an angle sloping downwardly from said first face (22) to second face (24), said second flute (34) presenting a flute surface disposed at an angle sloping downwardly from said second face (24) to said first face (22) whereby said flutes (32 and 32) are asymmetrical relative to said center axis, said cutting insert (20) having a holde (36) extending between said faces, as fastener (38) extending through said hole (36) and engaging said top holder (12) for securing said cutting insert (20) in said pocket (16), aid top wall (30) lying in a plane which is perpendicular to said center axis and said side walls

(28) to define non-cutting intersections between said top wall (30) and said flutes (32 and 34);

said flute surface of said first flute (32) slopes from said first face (22) to said second face (24) an acute angle relative to said first face (22) to define a first line intersection (42) with said top wall (30) which is disposed at an angle other than 90° relative to said faces, and said flute surface of said second flute (34) slopes from said second face (24) to first face (22) an acute angle relative to said second face (24) to define a second line intersection (44) with said top wall (30) which is disposed at an angle other than 90° relative to said faces and parallel to said first line intersection (42) whereby aid line intersections (42 and 44) and said first (22) and second (24) faces define a parallelogram as viewed from the top;

said flute surface of said first flute (32) slopes from said first face (22) to second face (24) along the entire length of the arc thereof to define a third line intersection (46) with one of said side walls (28) which is disposed at an angle other than 90° relative to said faces, and said flute surface of said second flute (34) slopes from said second face (24) to first face (22) along the entire length of the arc thereof to define a fourth line intersection (48) with the other side which is disposed at an angle other than 90° relative to said faces;

each of said flute surfaces slopes downwardly at a greater angle at the center of the arc thereof than at the ends of the arc thereof.

8. A cutting insert (20) comprising:

first and second oppositely facing, parallel faces interconnected by a bottom and side (28) and top (30) walls perpendicular to said faces with said side walls (28) being parallel to one another and said paralell faces extending co-extensively between said side walls (28);

said cutting insert (20) having a center axis centrally disposed between said side walls (28);

said cutting insert (20) having first and second flutes disposed on opposite sides of said center axis, said first flute (32) extending in an arc from the top wall (30) to one of the side walls (28) and said second flute (34) extending in an arc from the top wall (30) to the other of the side walls (28), said first flute (32) presenting a flute surface extending in said arc and disposed at an angle sloping downwardly from said first face (22) to said second face (24), said second flute (34) presenting a flute surface extending in said arc and disposed at an angle sloping downwardly from said second face (24) to said first face (22) whereby said flutes (32 and 34) slope in opposite directions, said cutting insert (20) having a hole (36) extending between said faces for receiving a fastener (38) for securing said cutting insert (20) in a pocket (16) in a tool holder (12), said top wall (30) lying in a plane which is perpendicular to said center axis and said side walls (28) to define non-cutting intersections between said top wall (30) and said flutes (32 and 34).

9. The cutting insert as set forth in claim 8 wherein said bottom (26) is V-shaped.

10. The cutting insert as set forth in claim 9 wherein said V-shaped bottom (26) has an included angle of 112°.

11. The cutting insert as set forth in claim 8 wherein said flute surface of said first flute (32) slopes from said first face (22) to second face (24) an acute angle relative to said first face (22) to define a first line intersection (42) with said top wall (30) which is disposed at an angle other than 90° relative to said faces, and said flute surface of said second flute (34) slopes from said second face (24) to first face (22) an acute angle relative to said second face (24) to define a second line intersection (44) with said top wall (30) which is disposed at an angle other than 90° relative to said faces and parallel to said first line intersection (42) whereby said line intersections (42 and 44) and said first (22) and second (24) faces define a parallelogram as viewed from the top.

12. The cutting insert as set forth in claim 11 wherein said flute surface of said first flute (32) slopes from said first face (22) to said second face (24) along the entire length of the arc thereof to define a third line intersection (46) with one of said side walls (28) which is disposed at an angle other than 90° relative to said faces, and said flute surface of said second flute (34) slopes from said second face (24) to first face (22) along the entire length of the arc thereof to define a fourth line intersection (48) with the other side which is disposed at an angle other than 90° relative to said faces.

13. A cutting insert (20) comprising;

first and second oppositely facing, parallel faces interconnected by a bottom and side (28) and top (30) walls perpendicular to said faces with said side walls (28) being parallel to one another;

said cutting insert (20) having a center axis centrally disposed between said side walls (28);

said cutting insert (20) having first and second flutes disposed on opposite sides of said center axis, said first flute (32) extending in an arc from the top wall (30) to one of the side walls (28) and said second flute (34) extending in an arc from the top wall (30) to the other of the side walls (28), said first flute (32) presenting a flute surface extending in said arc and disposed at an angle sloping downwardly from said first face (22) to said second face (24), aid second flute (34) presenting a flute surface extending in said arc and disposed at an angle sloping downwardly from said second face (24) to said first face (22) whereby said flutes (32 and 34) slope in opposite directions, said cutting insert (20) having a hole (36) extending between said faces for receiving a fastener (38) for securing said cutting insert (20) in a pocket (16) in a tool holder (12), said top wall (30) lying in a plane which is perpendicular to said center axis and side walls (28) to define cutting intersections between said top wall (30) and said flutes (32 and 34);

said flute surface of said first flute (32) slopes from said first face (22) to second face (24) an acute angle relative to said first face (22) to define a first line intersection (42) with said top wall (30) which is disposed at an angle other than 90° relative to said faces, and said flute surface of said second flute (34) slopes from said second face (24) to first face (22) an acute angle relative to said second face (24) to define a second line intersection (44) with said top wall (30) which is disposed at an angle other than 90° relative to said faces, and parallel to said first line intersection (42) whereby said line intersections (42 and 44) and said first (22) and second (24) faces define a parallelogram as viewed from the top;

said flute surface of said first flute (32) slopes from said first face (22) to said second face (24) along the entire length of the arc thereof to define a third line intersection (46) with one of said side walls (28) which is disposed at an angle other than 90° relative to said faces, and said flute surface of said second flute (34) slopes from said second face (24) to first face (22)

along the entire length of the arc thereof to define a fourth line intersection (48) with the other side which is disposed at an angle other than 90° relative to said faces;

each of said flute surfaces slopes downwardly at a greater angle at the center of the arc thereof than at said line intersections at the ends of the arc thereof.

14. The cutting insert as set forth in claim 13 wherein said bottom (26) is V-shaped and the edges thereof are beveled between said V-shaped bottom (26) and said faces (22 and 24).

15. The cutting insert as set forth in claim 13 wherein said first, second, third and fourth intersections are all disposed at the same predetermined angle of slope.

16. A cutting insert (20) comprising:

First and second oppositely facing, parallel faces interconnected by a bottom (26) and side (28) and top (30) walls perpendicular to said faces with said side walls (28) being parallel to one another and said parallel faces extending co-extensively between said side walls (28);

Said cutting insert (20) having a center axis centrally disposed between said side walls (28);

Said cutting insert (20) having a first (32) and second (34) flutes disposed on opposite sides of said center axis, and first flute (32) extending in an arc from the top wall (30) to one of the side walls (28) and said second flute (34) extending in an arc from the top wall (30) to the other of the side walls (28), said first flute (32) presenting a flute surface extending in said arc and disposed at an angle sloping downwardly from said first face (22) to said second face (24) along the entire arc thereof to define intersections with said top wall (30) and one of said side walls (28) respectively which are disposed at an angle other than 90° relative to said faces, said second flute (34) presenting a flute surface extending in said arc and disposed at an angle sloping downwardly from said second face (24) to said first face (22) along the entire arc thereof to define intersections with said top wall (30) and the other side wall (28) respectively which are disposed at an angle 90° relative to said faces.

17. The cutting insert as set forth in claim 16 wherein each of said flute surfaces slopes downwardly at a greater angle at the center of the arc thereof than at said line intersections at the ends of the arc thereof.

* * * * *